UNITED STATES PATENT OFFICE 2,125,094

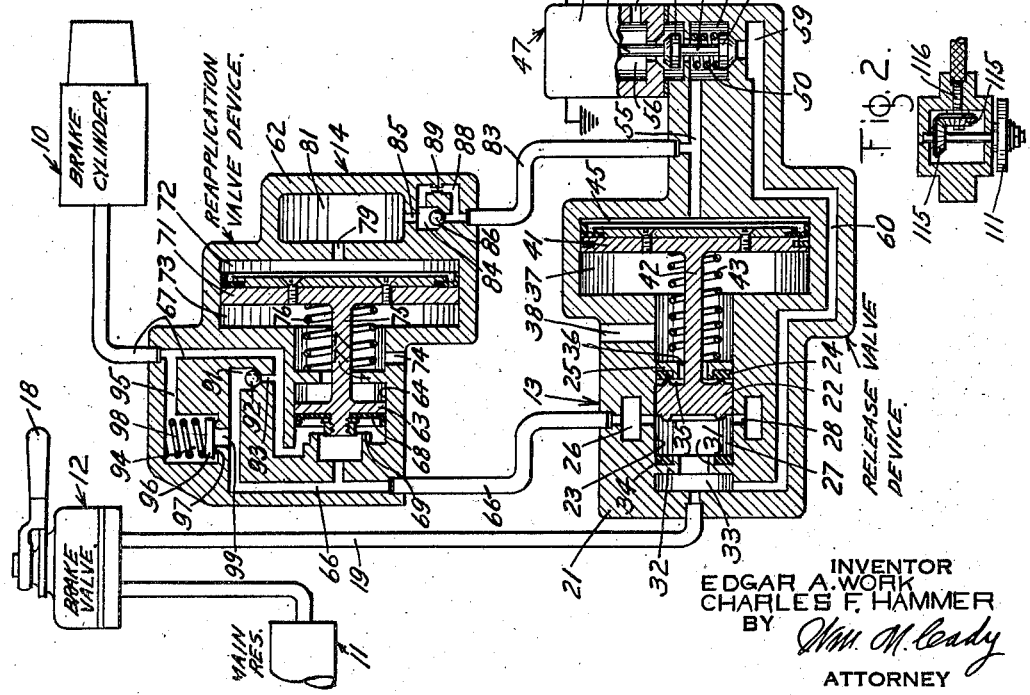

VEHICLE BRAKE CONTROL APPARATUS

Edgar A. Work, Lancaster, Ohio, and Charles F. Hammer, Greensburg, Pa., assignors to The Westinghouse Air Brake Company, Wilmerding, Pa., a corporation of Pennsylvania Application May 6, 1937, Serial No. 141,106

18 Claims. (Cl. 303—21)

This invention relates to vehicle brake control apparatus, and particularly to vehicle brake control apparatus including means for guarding against sliding of the vehicle wheels.

The term "sliding", as employed herein with reference to vehicle wheels, refers to the dragging of a vehicle wheel along a road surface or rail while the wheel is in a locked state, as distinguished from "slipping" of the vehicle wheel which term is employed herein to designate the rotation of a vehicle wheel at a speed less than a speed corresponding to vehicle speed, as when decelerating toward a locked state. The interval of time which elapses from the instant that a vehicle wheel begins to slip to the instant that the wheel attains a locked condition is referred to as the "slipping time" or "slipping period".

Various devices have been proposed which are effective, upon the slipping of a vehicle wheel, to cause fluid under pressure to be rapidly released from a brake cylinder so as to release the brakes on the slipping wheel and thus enable it to return to a rotative speed corresponding to vehicle speed and thereby prevent sliding of the wheel. With but few known exceptions, however, such as the equipment disclosed in the copending application Serial No. 718,376 of Joseph C. McCune, filed March 31, 1934, and copending application Serial No. 111,690 of Joseph C. McCune, filed November 19, 1936, both applications being assigned to the assignee of the present application, such devices are effective to restore the original brake cylinder pressure which initiated the slipping of the wheel, when a vehicle wheel returns toward a speed corresponding to vehicle speed upon relief of the slipping.

In view of the fact that the vehicle speed is constantly reducing during an application of the brakes and that the coefficient of friction between the brake shoes and the braking surface of the vehicle wheels is, therefore, increasing, the retarding force exerted on a vehicle wheel for a given brake cylinder pressure or braking force is correspondingly increased upon the reapplication of the brakes following the slipping of the wheel. As a result, the restoration of the original brake cylinder pressure which initiated slipping of the wheel is very likely to cause recurrence of slipping unless the condition of the road surface or rails changes in the meantime to such an extent that the coefficient of adhesion between the rim of the vehicle wheel and the road surface or rails can sustain the restored retarding force on the vehicle wheels without slip of the wheels occurring.

The desirability of preventing constant repetition or recurrence of wheel-slipping due to restoration of the original braking force by an anti-wheel-sliding equipment will be apparent, for if the wheel continues to slip repeatedly after each reapplication of the brakes, the brake cylinder pressure must necessarily be repeatedly reduced, thus incidentally causing fluid under pressure to be repeatedly wasted. If then, repeated releases of the brakes, following the initial release in response to the first slipping of the vehicle wheels, may be prevented, it will be apparent that the repeated venting of the fluid under pressure from the brake cylinder will be obviated and the resultant advantage attained of conservation of fluid under pressure in the system.

It is possible, in the case of a single vehicle or car, that a fluid compressor may supply sufficient fluid under pressure to maintain the supply reservoir for the system charged to a normal pressure despite the repeated venting of fluid under pressure from the brake cylinder, but it should be obvious that in a brake control equipment for railway trains having a number of cars in a train the capacity of the fluid compressor will be ineffective to maintain the supply pressure in the system against the repeated venting of fluid under pressure from a large number of brake cylinders. Thus, if the vehicle wheels are permitted to slip repeatedly upon reapplication of the brakes following each slipping thereof in the case of a train of cars, the supply pressure in the system in the brake equipment may be reduced to such an extent as to impair the effectiveness of the braking equipment with the consequent lack of safety and danger of serious consequences.

It has been proposed in the above-mentioned copending applications to provide equipment adapted to control the reapplication of the brakes in a manner so as to render negligible the likelihood of recurrence of wheel-slipping upon reapplication of the brakes following the initial slipping of the vehicle wheel.

It is an object of our invention to provide a brake control equipment which is of relatively simple construction compared to the equipments disclosed in the above mentioned copending applications and which is adapted to control the reapplication of the brakes, following the release of the brakes occurring upon the slipping of the vehicle wheel, in such manner as to minimize the likelihood of recurrence of wheel-slipping.

More specifically, it is an object of our invention to provide a brake control equipment including anti-wheel sliding means adapted to automatically limit the degree of the braking force upon reapplication of the brakes, following a slipping of the wheel, to a degree lower than the degree which initiated the slipping of the vehicle wheel.

Another object of our invention is to provide an anti-wheel sliding brake control equipment, of the character indicated in the foregoing object, adapted to cause the brakes to be reapplied upon the relief of the wheel-slipping condition first at a rapid rate and then at a slower rate.

The above objects, and other objects of our invention which will be made apparent hereinafter, are attained by several embodiments of our invention, shown in the accompanying drawing, wherein, Fig. 1 is a diagrammatic view, with parts in section, showing the essential elements of a brake equipment embodying our invention, Fig. 2 is a fragmentary sectional view, taken on the line 2—2 of Fig. 1, Fig. 3 is a fragmentary sectional view, taken on the line 3—3 of Fig. 1, and Fig. 4 is a fragmentary sectional view, showing a modification of the reapplication valve device shown in Fig. 1.

*Description of embodiment shown in Fig. 1*

The embodiment of our invention, shown in Fig. 1, comprises a brake cylinder 10, a reservoir 11, hereinafter called the main reservoir, which is charged with fluid under pressure in the usual manner by a fluid compressor not shown, a brake valve device 12 of any suitable construction adapted to supply fluid under pressure from the main reservoir 11 to the brake cylinder 10, a release valve device 13, a reapplication valve device 14, and a wheel-slip detector 15.

The brake valve device 12 may be of any suitable construction and includes an operating handle 18 which is normally in a brake release position to cause a pipe 19 through which fluid under pressure is supplied to the brake cylinder 10 to be connected to atmosphere, and which is operative out of the brake release position to cause the establishment of a desired fluid pressure in the pipe 19 and accordingly in the brake cylinder 10 to correspondingly control the degree of a brake application.

The release valve device 13 comprises a casing 21 containing a piston valve 22 shiftable in a bore 23 in one direction into seated relation on a gasket seat 24, fixed on an annular stop 25, to control communication through a plurality of ports 28 from an annular chamber 26 to a chamber 27 at one side of the piston valve. The chamber 27 is connected by a central passage 31, in an annular stop 32 at one end of the bore 23, to a chamber 33 to which the pipe 19 is constantly connected.

When the piston valve 22 is shifted in the opposite direction away from the annular stop 25 it engages in seated relation a gasket seat 34 on the annular stop 32 to cut off communication between the chamber 26 and the chamber 33 through the passage 31 and at the same time to establish communication through the ports 28 between the annular chamber 26 and a chamber 35 on the opposite side of the piston valve 22 to the chamber 27. The chamber 35 is constantly connected through a central passage 36 in the annular stop 25, to a chamber 37 which is constantly connected to atmosphere through a relatively large port 38.

The piston valve 22 is adapted to be shifted between the oppositely seated positions on gaskets 24 and 34 by a fluid pressure responsive device such as a piston 41 contained in the casing and having a stem 42 at one side thereof which extends through the central passage 36 in the annular stop 25 and is attached to or integrally united with the piston valve 22. Contained in the chamber 37 at one side of the piston 41 is a spring 43 which is interposed between the piston 41 and the annular stop 25 in such manner as to normally shift the piston 41 to an extreme right-hand position as determined by the engagement of the piston valve 22 with the gasket seat 24.

When fluid under pressure is supplied to a chamber 45 at the side of the piston 41 opposite to the chamber 37, spring 43 is overcome and the piston valve 22 is shifted in the left-hand direction into seated relation on the gasket seat 34.

A magnet valve device 47 is provided for controlling the supply of fluid under pressure to the chamber 45 and the release of fluid under pressure therefrom. The magnet valve device 47 comprises a pair of oppositely seating valves 48 and 49, hereinafter called the supply valve and the release valve, respectively, which are connected by a common stem 51 and adapted to be operated between oppositely seated positions by an electromagnet 52 through the medium of a plunger or stem 53 associated with the electromagnet and connected to the release valve 49.

When the electromagnet 52 of the magnet valve device 47 is deenergized, the supply valve 48 and the release valve 49 are suitably biased to seated and unseated positions, respectively, as by a spring 50 interposed between the casing and the supply valve 48. With the release valve 49 unseated, communication is established from a chamber 54, which is constantly connected to the piston chamber 45 through a passage 55, to a chamber 56 which is constantly open to atmosphere through an exhaust port 57. Thus, when the electromagnet 52 is deenergized, fluid under pressure is vented from the piston chamber 45 to atmosphere through the exhaust port 57.

When the electromagnet 52 of the magnet valve device 47 is energized, the supply valve 48 and the release valve 49 are shifted to unseated and seated positions, respectively, against the opposing force of spring 50. In its seated position, the release valve 49 cuts off the exhaust communication for the piston chamber 45 just described. In its unseated position, the supply valve 48 establishes communication from the chamber 54 to a chamber 59 which is connected to the chamber 33 through a passage 60. It will thus be apparent that, with the chamber 33 charged with fluid under pressure from the supply pipe 19, the unseating of the supply valve 48 establishes communication through which fluid under pressure is supplied to the piston chamber 45.

The reapplication valve device 14 comprises a casing 62 containing a valve piston 63 which operates slidably in a bore 64 of the casing. The valve piston 63 is normally in a position to open communication from a passage and pipe 66, which is connected to the annular chamber 26 of the release valve device 13, to a passage and pipe 67 leading to the brake cylinder 10.

The valve piston 63 carries thereon a suitable gasket 68 which engages an annular rib seat 69, when the valve piston 63 is shifted in the left-hand direction, to cut off the communication therepast from the passage 66 to the passage 67.

The valve piston 63 is shifted from its normal position to seated position on the annular rib seat 59 as by a piston 71 which has at one side thereof a chamber 72 for receiving fluid under pressure and at the opposite side a chamber 73 which is constantly open to atmosphere through a port 74 in the casing. The valve piston 63 may be connected to the piston 71 as by a stem 75.

Contained in the chamber 73 in surrounding relation to the stem 75 is a spring 76, which is interposed between an annular stop 77 and the piston 71, for urging the piston and accordingly the valve piston 63 to its normal position.

Constantly connected to the piston chamber 72 through a passage 79 is a volume reservoir 81, the purpose of which will be made apparent hereinafter.

The supply of fluid under pressure to and the release of fluid under pressure from the piston chamber 72 is under the control of the magnet valve device 47. As will be apparent in Fig. 1, the volume reservoir 81 is supplied with fluid under pressure from the passage 55 of the release valve device 13 through a pipe and passage 83 which opens into a chamber 84, in turn connected to the volume reservoir 81 through a port 85. Contained in the chamber 84 is a ball check valve 86 which is adapted to unseat to permit a rapid supply of fluid under pressure from the pipe and passage 83 to the piston chamber 72 and volume reservoir 81, and which is actuated to seated position to prevent reverse flow of fluid under pressure therepast from the piston chamber 72 and connected volume reservoir 81 to the passage and pipe 83. In by-pass relation to the ball check valve 86 is a passage 88 containing a restricted passage 89 for restricting the rate at which fluid under pressure may be released from the piston chamber 72 and the connected volume reservoir 81 to the pipe and passage 83. The purpose and the function of the restricted passage 89 will be made clear later.

The passage 66 in the casing 62 of the reapplication valve device 14 leads to a chamber 91 containing a ball check valve 92 which seats to close a port 93 to prevent the flow of fluid under pressure from the passage 66 to the passage 67 but which unseats to permit reverse flow of fluid under pressure through port 93 from the passage and pipe 67 and connected brake cylinder 10 to the passage and pipe 66.

Contained in a chamber 94, that is connected to the passage 67 by a branch passage 95, is a check valve 96 shown as of the disc type which is biased into seated position on an annular rib seat 97 by a yielding spring 98 to close the connection through a port 99 from the chamber 94 to the passage 66.

The spring 98 may be of any desired strength so as to prevent unseating of the check valve 96 in response to the pressure in the supply passage 66 until the pressure in the passage 66 exceeds a certain pressure, such as fifteen or twenty pounds per square inch. The function of the loaded check valve 96 will be made apparent hereinafter.

The wheel-slip detector 15 comprises a casing 101 having a chamber 102 containing a differential gear mechanism 103 similar to the well known differential gear mechanism provided on automotive vehicles. Suitably journaled for rotation in the casing 102 is a bevel ring gear 104 and an attached gear housing 105. Journaled in the gear housing 105 is a shaft 106 having rotatable thereon in spaced relation two oppositely faced bevel pinion gears 107. Cooperatively meshing at diametrically opposite points of the pinion gears 107 are two oppositely faced bevel gears 108 suitably mounted for rotation in the gear housing 105.

One of the bevel gears 108 is adapted to be rotated in one direction at a speed corresponding to the speed of travel of the vehicle and the other bevel gear 108 is adapted to be rotated in the opposite direction at a speed corresponding at all times to the rotative speed of a vehicle wheel 109. The rotation of the gears 108 may be accomplished in any suitable manner. For example, one of the gears 108 may be driven according to the speed of the vehicle as by providing a tracer wheel 111 which is suitably mounted on a portion 112 of the car body or car truck and yieldingly urged, as by springs 113, into frictional contact with the road surface or track rail 114, the tracer wheel 111 being effective, through bevel gears 115, to rotate a flexible shaft 116 to which the gear 108 is fixed. As is customary in the case of flexible shafts, a suitable armored sheathing 117 is provided.

In a similar manner, a tracer wheel 119 is suitably mounted on a portion 121 of the car body or car truck and yieldingly urged, as by springs 121, into frictional contact with the rim of the vehicle wheel 109, the gear 108 being fixed to a flexible shaft 123 which is rotated according to the rotation of the tracer wheel 119, through bevel gears 122. A suitable armored sheathing 124 is provided for the shaft 123.

The arrangement of the differential gear mechanism 103, the tracer wheels 111 and the bevel gears 115 and 122 is such that if the vehicle wheel 109 rotates at a speed corresponding to vehicle speed, the two bevel gears 108 will be rotated simultaneously in opposite directions at the same speed so that the pinion gears 107 merely idle on the shaft 106 and no rotation of the gear housing 105 and the attached ring gear 104 is produced. If, however, the vehicle wheel 109 begins to slip, the difference in the rotative speed of the two bevel gears 108 causes rotation of the gear housing 105 and of the ring gear 104 at a speed corresponding to the difference between the rotative speeds of the two bevel gears 108.

The wheel-slip detector 15 further comprises a centrifuge 131 rotated according to the speed of rotation of the ring gear 104 and adapted to operate a movable switch contact member 132 controlling a circuit for energizing the electromagnet 52 of the magnet valve device 47. The centrifuge 131 may comprise a rotary element 133 suitably mounted for rotation within the casing 101 and having fixed thereto a rod or shaft which has fixed thereon a bevel pinion gear 135 meshing with the ring gear 104. Pivotally mounted on the rotary element 131 intermediate the ends thereof are a plurality of levers 136 having weights, such as fly-balls 137, fixed to the outer ends thereof, the inner ends of the levers being in engagement with a collar or flange 138 fixed on a stem 139 which carries the switch contact member 132 in insulated relation thereon.

A spring 141, interposed between the rotary element 133 and the collar 138 of the stem 139, urges the stem downwardly so as to cause the contact member 132 to disengage a pair of associated fixed contact fingers 142 and thereby interrupt the circuit for the electromagnet of the magnet valve device 47. The spring 141 is preferably lightly tensioned and the gear ratio between the ring gear 104 and pinion 135 is such that when the ring gear 104 rotates in excess of a relatively low speed the rotary element 133 rotates at a relatively high speed and thus causes the centrifugal force on the fly-balls 137 to exert sufficient force upwardly on the collar 138 to overcome the opposing force of the spring 141 and consequently shift the stem 139 upwardly to effect circuit-closing engagement of the contact member 132 with the contact fingers 142.

It will be apparent, therefore, that when the rotative speed of the vehicle wheel 109 reduces or slips more than a certain low number of revolutions per minute below a number of revolutions per minute corresponding to the speed of travel of the vehicle or train, contact member 132 is actuated to circuit-closing position. It will, furthermore, be apparent that as long as the vehicle wheel 109 continues to rotate at such reduced speed relative to the speed of the vehicle, that is, as long as the wheel continues to slip, the contact member 132 remains in circuit-closing position.

The circuit for energizing the electromagnet 52 of the magnet valve device 47 is obvious and needs no description other than that the switch contact member 132, when actuated to circuit-closing position, connects the electromagnet 52 of the magnet valve device 47 in circuit with a suitable source of current indicated as a battery 145.

Operation

In operation, assuming that the main reservoir 11 is charged to normal pressure thereof and that the vehicle or train is traveling along the road under power, an application of the brakes may be effected by first cutting off the power to the propelling motors and then operating the handle 18 of the brake valve device 12 to supply fluid under pressure from the main reservoir 11 to the brake cylinder 10. Fluid under pressure is supplied from the main reservoir 11 to the brake cylinder through the brake valve device 12, pipe 19, chamber 33, passage 31, chamber 27, ports 28, chamber 26, pipe and passage 66, past the unseated valve piston 63, and passage and pipe 67. If the brake valve device 12 is of the self-lapping type, the handle 18 is operated from a normal position into an application zone a desired degree to establish a pressure in the brake cylinder 10 corresponding to the position of the handle 18 in the application zone. If the brake valve device 12 is of the automatic type, the handle 18 is operated to an application position to supply fluid under pressure to the pipe 19 and, when the desired pressure is attained in the brake cylinder 10, then shifted to a lap position to cut off the further supply of fluid under pressure to the brake cylinder.

As long as the vehicle wheel 109 continues to rotate at a speed corresponding to vehicle speed, the magnet valve device 47 of the release valve device 13 remains deenergized and, consequently, the position of the piston valve 22 and valve piston 63 of the release valve device 13 and the reapplication valve device 14 remains unchanged. If, therefore, the vehicle wheel 109 does not slip, during an application of the brakes, the brakes may be released by operating the handle 18 of the brake valve device 12 in such a manner as to exhaust fluid under pressure from the brake cylinder 10 through pipe and passage 67, in parallel past the ball check valve 92 and the unseated valve piston 63 to the passage and pipe 66, thence through annular chamber 26, ports 28, chamber 27, passage 31, chamber 33, and pipe 19.

If, however, the pressure established in the brake cylinder 10 by operation of the brake valve device 12 in the manner described produces such a degree of application of the brakes on the vehicle wheel 109 as to initiate slipping thereof, the wheel-slip detector 15 responds and switch contact member 132 is accordingly actuated to circuit-closing position to cause energization of the electromagnet 52 of the magnet valve device 47.

The supply valve 48 and the release valve 49 of the magnet valve device 47 are accordingly shifted from their normal positions shown to unseated and seated positions respectively, fluid under pressure being accordingly supplied from the supply pipe 19 and chamber 33 to the piston chamber 45 of the release valve device 13 and valve piston chamber 72 of the reapplication valve device 14. The pressure of the fluid supplied to the piston chamber 45 shifts the piston 41 in the left-hand direction to cause the piston valve 22 to move in the left-hand direction into seated engagement with the gasket seat 34 on the annular stop 32, thus cutting off the connection from the pipe 19 to the pipe 66 leading to the brake cylinder 10 and establishing communication from the pipe 66 and the connected brake cylinder 10 to atmosphere by way of the annular chamber 26, ports 28, chamber 35, passage 36, chamber 37 and exhaust port 38.

The ball check valve 86 is unseated upon the supply of fluid under pressure into the pipe and passage 83 from the passage 55 and consequently permits rapid flow of fluid under pressure to the volume reservoir 81 and piston chamber 72 so that the piston 71 is shifted in the left-hand direction substantially together with the piston 41, to cause the valve piston 63 to engage the annular rib seat 69 and cut off the connection therepast between the passage 67 and the passage 66. The exhaust communication through which fluid under pressure is released from the brake cylinder 10 by way of the exhaust port 38 of the release valve device 13 is, however, maintained independently of the seating of the valve piston 63 due to the fact that the ball check valve 92 unseats to permit rapid flow of fluid under pressure from the passage and pipe 67 and the connected brake cylinder 10 to the passage and pipe 66.

It will thus be apparent that, substantially upon the initiation of slipping of the vehicle wheel 109, fluid under pressure is rapidly released to atmosphere from the brake cylinder 10.

It has been determined that in cases where the degree of the application of the brakes is reduced substantially immediately upon the inception of the slipping of wheels, a slipping time or slipping period of the order of one second or more occurs. It is possible, therefore, to so design the equipment that the reduction in brake cylinder pressure is effected sufficiently rapidly within the slipping period that the vehicle wheel may never attain the locked wheel state but will cease deceleration and begin to accelerate back to a rotative speed corresponding to vehicle speed prior to attaining the locked-wheel state.

However, even though the vehicle wheel 109 should attain the locked-wheel state, it will remain in such state only momentarily because the continued rapid reduction in brake cylinder pressure eventually reduces the application of the brakes to such a degree that the wheel immediately begins to accelerate back toward a speed corresponding to vehicle speed.

When the vehicle wheel 109 returns substantially to a speed of rotation corresponding to vehicle speed and the switch contact member 132 of the wheel-slip detector 15 is accordingly actuated to circuit-opening position, the electromagnet 52 of the magnet valve device 47 is deenergized. As a result of the deenergization of the electromagnet 52, the supply valve 48 is reseated and the release valve 49 is unseated so that the supply of fluid under pressure to the piston chambers 45 and 72 is cut off and communication established, in the manner previously described, through which fluid under pressure is released from both the piston chambers 45 and 72 to atmosphere through the exhaust port 57 of the magnet valve device 47. The exhaust of fluid under pressure from the piston chamber 45 is effected rapidly and consequently the piston valve 22 of the release valve device 13 is almost immediately shifted in the right-hand direction into seated relation on the gasket seat 24, thereby cutting off the communication between the pipe and passage 66 and the connected brake cylinder 10 to atmosphere through the exhaust port 38 and reestablishing communication from the supply pipe 19 to the pipe and passage 66.

Fluid under pressure is released from the piston chamber 72 of the reapplication valve device 14 at a relatively slow rate, however, due to the restricted passage 89 and consequently the valve piston 63 is maintained seated on the annular rib seat 69 for a length of time determined by the capacity of the volume reservoir 81 and the flow area of the restricted passage 89. The capacity of the volume reservoir 81 and the flow area of the restricted passage 89 are preferably such that the valve piston 63 is maintained in seated relation on the annular rib seat 69 for a length of time sufficient to enable the vehicle or train to be brought to a complete stop.

It will, accordingly, be seen that upon the restoration of the supply communication from the pipe 19 to the pipe 66 through the release valve device 13 in the manner just described, fluid under pressure can only be supplied to the brake cylinder 10 by unseating the loaded check valve 96 because valve piston 63 is seated and ball check valve 92 seats to prevent flow of fluid under pressure therepast to the brake cylinder. Accordingly, when the vehicle wheel 109 returns substantially to a speed corresponding to the vehicle speed, following slipping thereof, fluid under pressure is rapidly resupplied to the brake cylinder 10 but the ultimate pressure attained in the brake cylinder 10 is less than the pressure established in the supply pipe 19 by an amount which corresponds to the loading force of the spring 98. For example, if the spring 98 exerts a loading force which is the equivalent of fifteen pounds per sq. in. on the check valve 96 and the pressure established in the supply pipe 19 is seventy-five pounds per sq. in., the maximum pressure restorable in the brake cylinder 10 while the vehicle or train is still in motion will be sixty pounds per sq. in.

By thus limiting the restored pressure in the brake cylinder to a value lower than that which originated or initiated the slipping of the vehicle wheel 109, the likelihood of reoccurrence of slipping of the wheel 109 is minimized if not entirely obviated. It will be apparent that economy of consumption of fluid under pressure is thereby attained by preventing unnecessary repetition of the venting of the brake cylinder as in the case of other proposed anti-wheel-sliding devices wherein the original pressure which initiated the slipping of the wheels is immediately restored when the vehicle wheel returns toward a speed corresponding to the vehicle speed.

When the pressure in the piston chamber 72 of the reapplication valve device 14 reduces sufficiently following the delay interval previously described, and as previously stated preferably after the vehicle or train is brought to a complete stop, the valve piston 63 is shifted in the right-hand direction to its normal position wherein it is unseated from the annular rib seat 69. Fluid under pressure may then flow from the pipe and passage 66 past the unseated valve piston 63 to the passage and pipe 67 leading to the brake cylinder 10 to cause the pressure in the brake cylinder to rise to the pressure established in the supply pipe 19. With the vehicle stopped, however, the restoration of the brake cylinder pressure corresponding to that which initiated wheel slipping or wheel sliding results only advantageously since the vehicle wheel 109 is thereby held against rotation and the vehicle or train thereby held in stopped position with the greater braking force.

Since the release valve device 13 and the reapplication valve device 14 are always restored to the position shown in the drawing after the vehicle is brought to a complete stop, the pressure in the brake cylinder 10 may be exhausted to atmosphere and the brakes accordingly released under the control of the brake valve device 12 in the manner previously described.

In Fig. 4, a modified construction of the reapplication valve device 14 is shown which consists in providing a passage 151 between the passage 66 and the passage 67, in by-pass relation to the valve piston 63 and the loaded check valve 96, the passage 151 containing a choke fitting 152 having a restricted passage 153 therein.

In operation, fluid under pressure continues to be resupplied to the brake cylinder following relief of the wheel slipping condition through the restricted passage 153 of the choke fitting 152 notwithstanding the seating of the loaded check valve 96 when the pressure in the brake cylinder attains a certain fixed pressure lower than the supply pressure in pipe 66. Thus, following a wheel-slipping condition, fluid under pressure is initially rapidly resupplied to the brake cylinder 10 to a pressure which is a fixed amount less than the original pressure which initiated the wheel-slipping condition, as determined by the strength of the loading spring 98, and then at a relatively restricted or slow rate until the original pressure established in the supply pipe 98 is again established in the brake cylinder 10.

If the valve piston 63 is not unseated, due to the time delay in its operation following cessation of the wheel-slipping condition, until after the vehicle is brought to a stop, then by suitably designing the flow area of the restricted passage 153 of choke fitting 152, the brake cylinder pressure may never build up to the original pressure which initiated the wheel slipping before the vehicle is brought to a complete stop. The restricted passage 153 may, however, be such as to permit the reestablishment of the original brake cylinder pressure that is a pressure equal to that established in control or supply pipe 19, before the vehicle comes to a complete stop.

While we have illustrated our invention as applied to a single vehicle wheel, it will be understood that various modifications or additions may be effected, without departing from the spirit of our invention, in order to adapt the equipment for operation on all wheels of a vehicle or train. It is, accordingly, not our intention to limit the scope of our invention except as it is necessitated by the scope of the prior art.

Having now described our invention, what we claim as new and desire to secure by Letters Patent, is:

1. The method of operating vehicle wheel brakes which comprises effecting an application of the brakes to a certain degree, effecting a reduction in the degree of the brake application when a wheel starts to slip, effecting reapplication of the brakes when the wheel returns substantially to a speed corresponding to vehicle speed following the slipping thereof, and limiting the restored application of the brakes to a degree which is less than the certain degree which initiated the slipping of the wheel.

2. The method of operating vehicle wheel brakes which comprises effecting an application of the brakes to a certain degree, effecting a reduction in the degree of the brake application when a wheel starts to slip, effecting reapplication of the brakes when the wheel returns substantially to a speed corresponding to vehicle speed following the slipping thereof, and limiting the restored application of the brakes to a degree which is a fixed amount less than the certain degree which initiated the slipping of the wheel.

3. The method of operating vehicle wheel brakes which comprises effecting an application of the brakes to a certain degree, effecting a rapid reduction in the degree of the brake application when a wheel slips more than a certain degree below a speed corresponding to vehicle speed to cause cessation of the slipping, effecting reapplication of the brakes when the wheel returns, following the slipping thereof, to a speed having less than said certain degree of slip, and limiting the application of the brakes following the slipping of the wheel, to a degree which is less than the said certain degree which initiated the slipping of the wheel.

4. A vehicle brake system comprising means for effecting application of the brakes on a vehicle wheel, means operative automatically when the vehicle wheel slips due to the application of the brakes for reducing the degree of the brake application so as to cause the wheel to return toward a speed corresponding to vehicle speed and operative on the return of the vehicle wheel to a speed corresponding substantially to vehicle speed for restoring the brake application, and means effective to prevent for a limited time the restoration of the brake application beyond a degree which is a certain fixed amount lower than the degree which initiated the slipping of the wheel.

5. A vehicle brake system comprising means for effecting application of the brakes on a vehicle wheel, means operative automatically when the vehicle wheel slips due to the application of the brakes for reducing the degree of the brake application so as to cause the wheel to return toward a speed corresponding to vehicle speed and operative on the return of the vehicle wheel substantially to a speed corresponding to vehicle speed for restoring the brake application and means effective to limit the reapplication of the brakes to a degree which is always a certain uniform amount less than the degree which initiated the slipping of the wheel.

6. A vehicle brake system comprising means for effecting application of the brakes on a vehicle wheel, means operative automatically when the vehicle wheel slips due to the application of the brakes for reducing the degree of the brake application so as to cause the wheel to return toward a speed corresponding to vehicle speed and operative on the return of the vehicle wheel substantially to a speed corresponding to vehicle speed for restoring the brake application, and means effective for a limited time following the return of the vehicle wheel to a speed corresponding substantially to vehicle speed for preventing restoration of the brake application beyond a degree which is less than the degree which initiated the slipping of the wheel.

7. A vehicle brake system comprising a brake cylinder, a communication through which fluid under pressure is supplied to the brake cylinder to effect application of the brakes, a first valve means operative from a normal position to close said communication to prevent the further supply of fluid under pressure to the brake cylinder and to open said communication to atmosphere to vent fluid under pressure from the brake cylinder as long as a vehicle wheel slips more than a certain degree in speed below a speed corresponding to the vehicle speed, a second valve means operative from a normal position to close said communication when the vehicle wheel slips more than said certain degree below a speed corresponding to the vehicle speed, means effective for a certain uniform interval of time following the return of the vehicle wheel to a speed having less than the said certain degree of slip for preventing operation of said second valve means to open said communication, and means adapted, when said second valve means is in closed position and said first valve means is in its normal position, to permit the flow of fluid under pressure to the brake cylinder but effective to limit the pressure attained in the brake cylinder to a pressure which is a certain fixed amount less than that established in the said communication.

8. In a vehicle brake equipment, in combination, a brake cylinder, means operative to control the supply and release of fluid under pressure to and from the brake cylinder to effect an application and release of the brakes, a first valve means operative from a normal position to cut off the supply of fluid under pressure to the brake cylinder and to establish communication through which fluid under pressure is released from the brake cylinder, a second valve means operative from a normal position to a position for preventing the supply of fluid under pressure therepast to the brake cylinder, means effective when the said second valve means is in the said operated position and when the first valve means is in its normal position, to permit the supply of fluid under pressure therepast to the brake cylinder and to cut off the supply of fluid under pressure to the brake cylinder when the pressure in the brake cylinder is a certain fixed amount less than the supply pressure, and means for controlling the operation of both said valve means.

9. In a vehicle brake equipment, in combination, a brake cylinder, means operative to control the supply and the release of fluid under pressure to and from the brake cylinder to effect an application and release of the brakes, a first valve means operative to cut off the supply of fluid under pressure to the brake cylinder and to establish communication through which fluid under pressure is released from the brake cylinder, a second valve means operative to a position for preventing the supply of fluid under pressure therepast to the brake cylinder, means effective when the second valve means is in the said operated position and when the first valve means is in its normal position, to permit the supply of fluid under pressure to the brake cylinder and to cut off the supply of fluid under pressure to the brake cylinder when the pressure in the brake cylinder is a certain fixed amount less than the supply pressure, means effective as long as a vehicle wheel slips in excess of a certain uniform degree in speed below a speed corresponding to the vehicle speed for effecting operation of both said valve means.

10. In a vehicle brake equipment, in combination, a brake cylinder, a control means operative to supply fluid under pressure to the brake cylinder to effect an application of the brakes, a first valve means operative from a normal position to cut off the supply of fluid under pressure to the brake cylinder and to establish communication through which fluid under pressure is released from the brake cylinder, a second valve means operative from a normal position to a position for preventing the supply of fluid under pressure therepast to the brake cylinder, means effective when the second valve means is in the said operated position and when the first valve means is in its normal position, to permit the supply of fluid under pressure to the brake cylinder and to cut off the supply of fluid under pressure to the brake cylinder when the pressure in the brake cylinder is a certain fixed amount less than the supply pressure, means effective as long as the vehicle wheel slips more than a certain uniform degree in speed below a speed corresponding to vehicle speed for effecting operation of both said valve means, and means effective to delay the return of said second valve means to its normal position for a certain period of time following the return of the wheel to a speed having less than said certain uniform degree of slip.

11. A vehicle brake equipment comprising a brake cylinder, two communications through which fluid under pressure may be supplied to the brake cylinder to effect an application of the brakes, means effective to cut off the supply of fluid under pressure to the brake cylinder through one of said communications when the pressure in the brake cylinder is a certain fixed amount less than the supply pressure and adapted to prevent back flow of fluid under pressure from the brake cylinder through said one communication, means operative to close said second communication upon the slipping of a vehicle wheel more than a certain degree in speed below a speed corresponding to vehicle speed and effective to maintain said second communication closed for a certain uniform time following return of the said vehicle wheel to a speed having less than said certain degree of slip, and means for effecting a release of fluid under pressure from the brake cylinder when said second communication is closed.

12. A vehicle brake equipment comprising a passage through which fluid under pressure may be supplied to the brake cylinder and released from the brake cylinder to effect the application and release of the brakes, three parallel communications connecting the said passage to the brake cylinder, means for preventing flow of fluid under pressure through one of said communications to the brake cylinder and adapted to permit reverse flow of fluid under pressure from the brake cylinder therethrough, means for preventing back flow of fluid under pressure from the brake cylinder through a second of said communications and adapted to permit the flow of fluid under pressure through said second communication to the brake cylinder until the pressure in the brake cylinder is a certain fixed amount less than the supply pressure in the said passage, and means operative to close the third of said communications upon the slipping of a vehicle wheel more than a certain degree below a speed corresponding to vehicle speed and effective to maintain said third communication closed for a certain interval of time following return of the vehicle wheel to a speed having less than said certain degree of slip.

13. A vehicle brake equipment comprising a passage through which fluid under pressure may be supplied to the brake cylinder and released from the brake cylinder to effect the application and release of the brakes, three parallel communications connecting the said passage to the brake cylinder, means for preventing flow of fluid under pressure through one of said communications to the brake cylinder and adapted to permit reverse flow of fluid under pressure from the brake cylinder therethrough, means for preventing back flow of fluid under pressure from the brake cylinder through a second of said communications and adapted to permit the flow of fluid under pressure through said second communication to the brake cylinder until the pressure in the brake cylinder is a certain fixed amount less than the supply pressure in the said passage, means operative to close the third of said communications upon the slipping of the vehicle wheel more than a certain degree below a speed corresponding to vehicle speed and effective to maintain said third communication closed for a certain interval of time following return of the vehicle wheel to a speed having less than said certain degree of slip, and means operative as long as the vehicle wheel slips more than said certain degree below a speed corresponding to vehicle speed for preventing the supply of fluid under pressure through the said passage and for establishing communication through which fluid under pressure is released from said passage to atmosphere.

14. The method of operating vehicle wheel brakes, which comprises effecting an application of the brakes to a certain degree, effecting a rapid reduction in the degree of the brake application when a wheel starts to slip and maintaining such rapid reduction as long as the wheel slips more than a certain amount below a speed corresponding to the vehicle speed, effecting the reapplication of the brakes at a rapid rate when the wheel again rotates, following slipping thereof, at a speed having less than said certain amount of slip, until the degree of application is a certain fixed amount less than the said certain degree, and finally further increasing the degree of the application towards said certain degree at a relatively slow rate.

15. A vehicle brake system comprising means for effecting the application of the brakes on a vehicle wheel, means operative automatically when a vehicle wheel slips due to the application of the brakes for reducing the degree of the application of the brakes so as to cause the wheel to tend to cease slipping and operative on the return of the vehicle wheel to a speed corresponding substantially to the vehicle speed for restoring the brake application, and means for effecting the restoration of the brake application at a rapid rate following slipping of the wheel until the degree of application is a certain fixed amount less than the degree which initiated the slipping of the wheel and effective thereafter to restrict the restoration of the brake application to a relatively low rate.

16. A vehicle brake equipment comprising a brake cylinder, a passage through which fluid under pressure may be supplied to the brake cylinder and released from the brake cylinder to effect the application and release of the brakes respectively, three separate communications connecting the said passage to the brake cylinder, means in one of said communications adapted to prevent the supply of fluid under pressure from said passage to the brake cylinder and the release of fluid under pressure from the brake cylinder to the said passage except at a relatively low rate, means for preventing back flow of fluid under pressure from the brake cylinder to the said passage through the second of said communications and adapted to permit flow of fluid under pressure from said passage to said brake cylinder at a rapid rate and to cut off the further supply of fluid under pressure from the passage to the brake cylinder through the second communication when the pressure in the brake cylinder is a certain fixed amount below the supply pressure in the said passage, means operative to close the third of said communications when a vehicle wheel slips more than a certain degree below a speed corresponding to the vehicle speed and effective to maintain the third communication closed as long as the vehicle wheel slips more than the said certain degree and for a predetermined length of time following reduction below said certain degree of slip, and means providing communication between the brake cylinder and the said passage through which fluid under pressure may be rapidly released from the brake cylinder independently of said three communications.

17. A vehicle brake equipment comprising a brake cylinder, a passage through which fluid under pressure may be supplied to the brake cylinder and released from the brake cylinder to effect the application and release of the brakes respectively, three parallel communications connecting the said passage to the brake cylinder, means in one of said communications adapted to prevent the supply of fluid under pressure from said passage to the brake cylinder and the release of fluid under pressure from the brake cylinder to the said passage except at a relatively low rate, means for preventing back flow of fluid under pressure from the brake cylinder to the said passage through the second of said communications and adapted to permit flow of fluid under pressure from said passage to said brake cylinder at a rapid rate and to cut off the further supply of fluid under pressure from the passage to the brake cylinder through the second communication when the pressure in the brake cylinder is a certain fixed amount below the supply pressure in the said passage, means operative to close the third of said communications when a vehicle wheel slips more than a certain degree below a speed corresponding to the vehicle speed and effective to maintain the third communication closed as long as the vehicle wheel slips more than the said certain degree and for a predetermined length of time following reduction below said certain degree of slip, means providing communication between the brake cylinder and the said passage through which fluid under pressure may be rapidly released from the brake cylinder independently of said three communications, and means effective as long as the vehicle wheel slips more than said certain degree for cutting off the supply of fluid under pressure through said passage and establishing communication through which fluid under pressure is released from said passage.

18. A vehicle brake system comprising means for effecting application of the brakes on a vehicle wheel, means operative automatically when the vehicle wheel slips due to application of the brakes for reducing the degree of the brake application so as to cause the wheel to return toward a speed corresponding to vehicle speed and operative upon the return of the vehicle wheel toward a speed corresponding to vehicle speed for restoring the brake application, and means effective for a limited time to prevent the restoration of the application of the brakes at a rate other than a relatively slow rate once the application attains a degree which is a certain fixed amount lower than the degree which initiated the slipping of the wheel.

EDGAR A. WORK.
CHARLES F. HAMMER.